Dec. 21, 1965 G. J. RUBENS 3,224,357
FOOD SMOKER ATTACHMENT FOR HOODED BRAZIERS
Filed Jan. 10, 1964 2 Sheets-Sheet 1
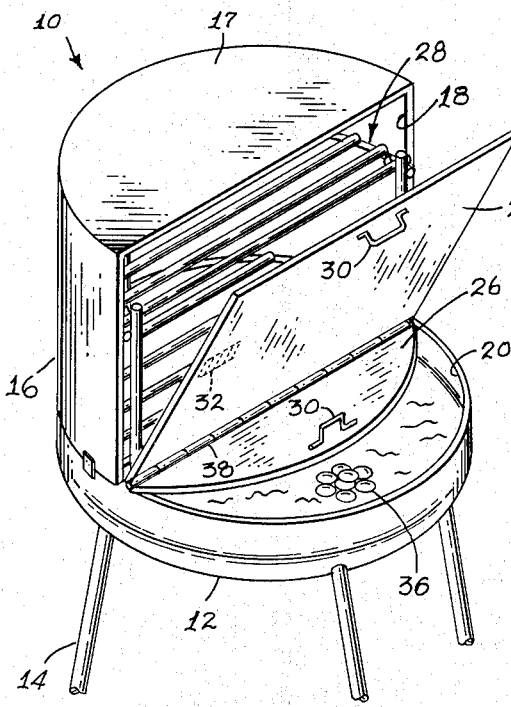
Fig. 1
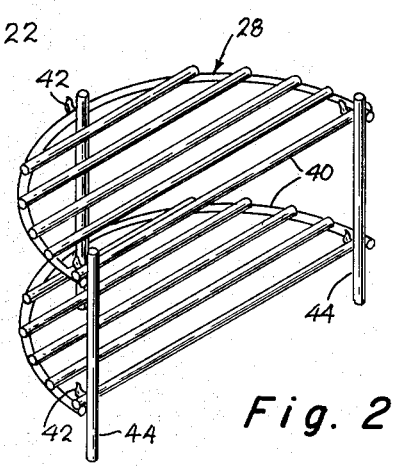
Fig. 2
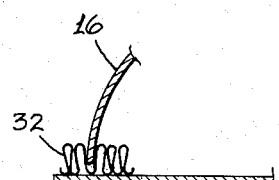
Fig. 4
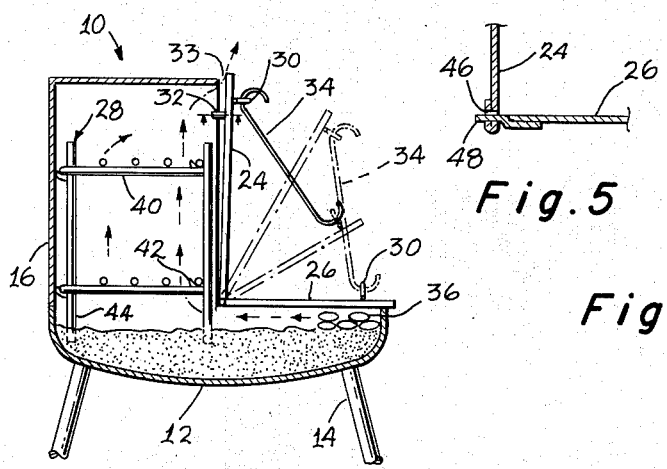
Fig. 3
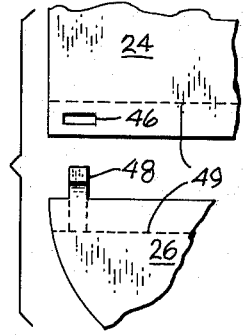
Fig. 5
Fig. 6
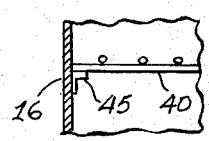
Fig. 3a
INVENTOR.
George J. Rubens Dec. 21, 1965  G. J. RUBENS  3,224,357
FOOD SMOKER ATTACHMENT FOR HOODED BRAZIERS
Filed Jan. 10, 1964  2 Sheets-Sheet 2

INVENTOR.
George J. Rubens

United States Patent Office 3,224,357
Patented Dec. 21, 1965

3,224,357
FOOD SMOKER ATTACHMENT FOR
HOODED BRAZIERS
George J. Rubens, Woodland Hills, Calif.
(8604 Melody Court, Bethesda, Md.)
Filed Jan. 10, 1964, Ser. No. 337,004
10 Claims. (Cl. 99—259)

This invention relates to barbecuing type braziers having a hood, and more particularly to a smoking attachment for such braziers.

The use of various types of portable braziers for broiling food in the outdoors has become such a popular method of cooking food that almost every home considers such apparatus as standard patio equipment. By far, the most conventional brazier in use is the type having a generally hemispherical basin, and usually provided with a semi-cylindrical hood covering approximately half of the basin. The hood serves as shelter for the fire against the wind, as well as to deflect the heat on the food being barbecued.

This type of brazier is limited to the barbecuing of food on a grill, or through a rotisserie that may be rotatably supported on the hood or basin. In the event one desires to smoke meat or fish, it is now necessary to purchase an entirely separate and distinct smoking apparatus specially designed for this purpose. Not only are these smokers expensive, especially for the amateur gourmet who only wishes to smoke food on relatively rare occasions, but, the bulky equipment involves a storage problem to the average house owner, not to mention the apartment dweller.

I have discovered that the aforedescribed brazier apparatus is particularly well suited for temporary conversion into a device for smoking foods by employment of an attachment which forms the subject matter of the present invention. The smoker attachment or kit converts the hood-type brazier into a food smoker without structural modification and without affecting the conventional use of the brazier. When not in use the smoker attachment can be compactly folded flat for storage or shipping, the latter advantage being important from a commercial consideration.

The novel smoker attachment comprises essentially a pair of closure members, preferably sheet metal, one closure member adapted to lie horizontally over and close the open half of the brazier basin, while the other closure member is adapted to be oriented vertically to close the opening in the hood. The two closure members in combination with the hooded basin, in effect, forms a closed chimney with a laterally spaced fire box, commonly referred to as an indirect smoking method and considered by gourmets as the preferred method. The horizontal closure member is pivotally mounted, preferably to the vertical closure member. This enables the horizontal closure member to be readily lifted for frequently attending the fire, and in one embodiment to enable the vertical closure member to be adjustably spaced from the hood to create a suitable upward draft of air from the fire area, as well as for gaining access to the food within the hood. means are provided for maintaining the vertical closure member in a normally upright position. Grill means are provided within the hood for supporting the food to be smoked, and the grill means can be supported independently in the basin; or as a part of the attachment frame; or as a part of the hood.

One object of this invention is to provide an attachment that will convert a hood-type brazier into a smoker capable of smoking foods, and a corollary object is to accomplish this conversion without the need for structurally modifying, nor permanently affecting the conventional use of the brazier.

Another object is to provide a one size smoker attachment that can be utilized on braziers of different sizes.

Still another object is to provide a smoker attachment that can be stored or shipped in a small, compact package.

A further object is to provide a smoker attachment which can be fabricated inexpensively.

Other objects, advantages, and novel features of the invention will become apparent from the following detailed description of the invention when considered in conjunction with the accompanying drawings wherein:

FIG. 1 is a perspective view of a conventional hood-type brazier on which is mounted the attachment of this invention for converting the brazier into a smoker device;

FIG. 2 is a perspective view of the grill component of the attachment for supporting the food to be smoked;

FIG. 3 is a sectional elevation view of FIG. 1, with the grill and closure members shown in full, showing the path of the smoke from the fire chamber through the hood, and also showing the closure members secured in a broken line partially open position for access to the respective areas;

FIG. 3a is a partial section of the basin showing lugs for supporting the grills;

FIG. 4 is a cross section of one of the vertical walls of the hood showing a clamp for adjustably securing the vertical closure door to the hood;

FIGS. 5 and 6 are elevation and plan views of the closure members, the former in section, showing a modified hinge construction;

Figure 7:
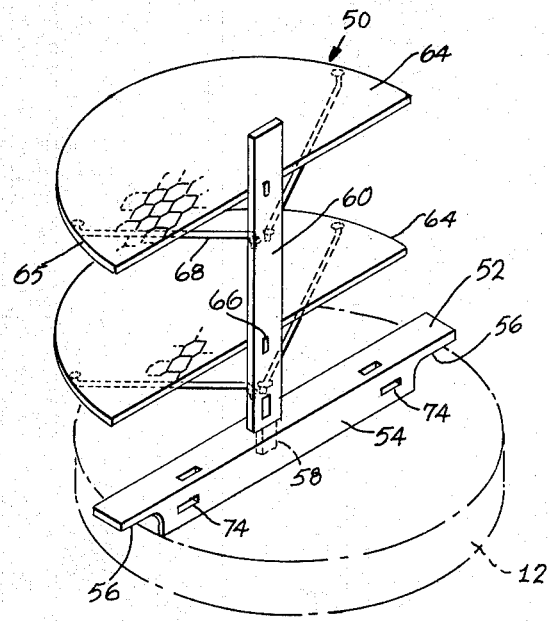
FIG. 7 is a perspective view of a modification of the smoker in which the grates are constructed as an integral part of the attachment, the closure doors being removed.

Referring to the drawing where like reference numerals refer to similar parts throughout the drawing there is shown in FIG. 1, a conventional hood-type brazier 10 having a semi-spherical basin 12 supported by a plurality of legs 14. A semi-cylindrical hood 16 having a top 17 is supported on, and covers, approximately one-half of basin 12, creating a vertical opening 18 in the hook, and a horizontal opening 20 in the basin.

The instant invention provides a smoker attachment 22 for use with the above-described brazier for readily and temporarily converting the brazier into an apparatus for smoking various types of foods. Smoker attachment 22 comprises generally a vertical closure member 24, a horizontal closure member 26, and a food supporting means 28. Vertical closure member 24 generally conforms to the configuration of hood 16, and in FIG. 1 is rectangular and dimensioned to be slightly larger than opening 18 which it closes. Closure member 24 is provided with a suitable handle 30 for opening and closing, being maintained in a vertical closed position by a folded-type spring clasp 32 (FIGS. 1 and 4) secured to the inside wall of the closure member, at one or both sides, and adapted to engage the edge of the hood wall. The folds or fingers of clamp 32 are of sufficient depth and resilient to engage the hood in a plurality of positions to enable closure member 24 to be adjustably spaced at the top of the hood to provide a variable vent opening 33 functioning much like chimney damper for a purpose later to be described (FIG. 3). Clasp 32 is provided with a plurality of horizontal fingers to enable the same closure member to be used for different diameter hoods, i.e. 24″, 20″ and 18″ which are popular sizes.

Instead of relying on clasp 32 to provide variable vent opening 33, a suitable adjustable opening such as a sliding window could be provided in the closure member which then could be kept snugly against the hood during the smoking operation.

Horizontal closure member 26 conforms generally to the basin configuration and in FIG. 1 is preferably semi-circular to conform to opening 20, the closure member being slightly larger than the maximum size basin on which it is intended for use to enable it to rest on the rim of the basin. Horizontal closure member 26 is also provided with a handle 30 which may be spot welded or detachably secured to simplify packaging for shipment. As illustrated in FIG. 3, a rigid arm 34 may be suspended detachably between handles 30 to enable vertical closure member 23 to be supported by closure member 26 via arm 34, in an open position to gain access to the hood interior to check the food being smoked; or to enable horizontal closure member 26 to be supported from vertical closure member 24 through arm 34, in an open position to gain access to the basin to tend the fire 36, both of these positions of the closure members being illustrated by broken lines in FIG. 3.

Figure 8:
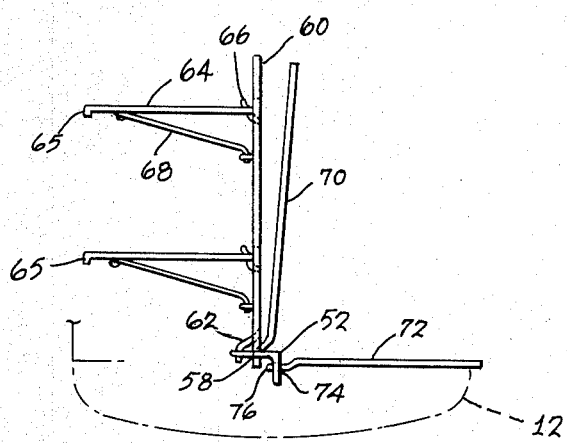
FIG. 8 is a side elevation of the smoker attachment of FIG. 7, with the closure doors in position supported by the brazier hood, not shown.

As shown in FIGS. 1 and 3, closure members 24 and 26 may be pivotally connected to each other by a piano or like hinge 38 as shown in FIG. 1, or by a pivotal connection as shown in FIGS. 5 and 6; or the closure members may be frictionally supported by a clip or like member as shown in FIGS. 7 and 8.

Food supporting means 28 which is housed in hood 16 for the smoking operation comprises one or more shelves 40, made of a grill of conventional manufacture, two shelves being illustrated.

In the smoker configuration disclosed in FIGS. 1-3, the shelves are secured together in spaced relation by clips 42 on vertical legs 44, the bottom ends of which are adapted to rest on the basin or the sand or like protective fill material usually placed in the basin (FIG. 3). The shelves 40 are preferably made detachable from legs 44 to permit disassembly for shipping purposes. As will be seen in FIGS. 7 and 8, food supporting means 28 may be supported on a framework resting on the basin rim instead of using legs. In addition, the grill can be made of an expanded metal which will greatly decrease the manufacturing cost. Another expedient for supporting food supporting means 28 is by substituting angle-shaped lugs 45 (FIG. 3a) for the legs in which case the grills could be supported directly by inside walls of the hood, one leg of each lug screwed or adhesively secured to the hood and the other leg forming a shelf for the grill.

FIGS. 5 and 6 disclose a modified hinge connection between closure members 24 and 26, which comprises a slot 46 formed in closure member 24 adapted loosely to receive a tongue 48 on closure member 26. Although the slot and the tongue could be provided on either closure members 26 and 24, respectively, it is preferred that the tongue be on closure member 26 since it will probably be opened more frequently to tend the fire. The abutting sides of the closure members 24 and 26 may be folded over at 49, to provide reinforced structural edges. Tongue 48 can be offset or Z shaped to enable the closure member 26 to be aligned with the bottom edge of closure member 24 and lie flat on the edge of the basin.

FIGS. 7 and 8 illustrate a modified smoker attachment 50 which generally differs from the embodiment in FIGS. 1-3 in that it is suspended within the hood, and is provided with a different type of grill. Attachment 50 is supported on the diametrically opposite sides of the brazier through a strongback 52 having a length greater than the diameter of the largest basin on which the attachment is to be utilized. The strongback may be made of conventional angle iron with the vertical lip 54 recessed at 56 at both ends so that the strongback will lie flat on the rim of basin 12. Recess 56 extends sufficiently to account for the different diameter basins on which the smoker may be used. Strongback 54 is provided with a recess 58 adapted to receive the reduced end of a vertical standard 60, the shoulder forming a stop. A leg 62 (FIG. 8) struck out from the bottom of the upright may serve an additional support function. One or more semi-circular grates 64 are supported on standard 60, two grates being illustrated, each grate being preferably fabricated of an expanded metal normally used for structural purposes, fences etc. Since the cost of conventional rod-type grates are relatively expensive, being hand-welded and fabricated, the use of expanded metal as a grill will materially reduce the cost of a major component of the attachment, which is an important sales consideration. The periphery of the expanded metal grates may be bent down at 65 to provide more rigidity and strength, if needed. The grates 64 may be used in the modification of FIGS. 1 to 3, and in FIG. 3.

Each grill may be supported at its center on standard 60 by lips 66 struck out from the standard and adapted to receive the bent over edge 65 of the grill, and the remainder of the grills may be supported to the upright by braces 68 wherever needed.

Standard 60 is constructed of sufficient height to abut hood top 17 and provide additional support for the smoker attachment. It is obvious that standard 60 could be made adjustable or telescopic to accommodate hoods of various heights.

Strongback 52 not only provides support for the grills 64 but also a support for vertical door 70 and horizontal door 72. In FIG. 7, strongback 52 is provided with two pairs of slots 74 to receive mating projections 76 on both vertical door 70 and horizontal door 72, providing a hinge similar to the modification of FIG. 6. If desired vertical door 70 could be supported on strongback 52 with a clip-like fastener. The same securing means shown in FIG. 4 used on the embodiment in FIGS. 1-3, can be employed on vertical door 70 for adjustably clamping the door to the hood 16. Likewise, a rigid arm 34 may also be used to latch the doors alternatively to an open position. In place of a food supporting grill, upright 60 could be used to support a plurality of horizontal arms, like a Christmas tree effect from which the food to be smoked can be suspended by hooks, not shown.

The operation of the novel smoker attachment 22 is probably apparent from the drawings. When it is decided to use the attachment, it is readily assembled from a compact, knock-down condition and inserted into the brazier. In the event that the grill means are supported in the hood by legs 44 or lugs 45, it can be left in the hood when the brazier is used for conventional barbecuing purposes. The food to be smoked is placed on the grills laterally spaced from each other to allow the passage of smoke therebetween. Vertical door 24, or 70, is almost completely closed leaving a slight vent opening 33, the door being maintained in this position by clasp 32. If a vent window is provided in door 24, it may be completely closed. Horizontal door 26 is raised and hooked in an open position by arm 34 in order to permit lighting and maintenance of the fire bed 36, usually made of charcoal briquets. As soon as an adequate fire is built, water soaked wood chips, such as hickory, are added to the fire to create the smoke. Horizontal door 26 is then closed. The smoke follows the path of the arrows shown in FIG. 3 through the grills, around the food and out through vent 33. The amount of the draft for the smoke can be adjusted by increasing or decreasing the size of vent opening 33 or the window for this purpose.

Both doors are occasionally opened, door 24 to sample the food for the degree of smoking, and door 26 to maintain the fire and the smoke by adding wood chips. Thus, as a practical matter doors 24 and 26 should be capable of being readily openable, and conveniently maintained in such position to enable the chores to be accomplished, simply and expediently.

Although it is possible to leave the circular grill that is normally with the brazier in position during use of the smoker for use as an additional grill, as a practical matter, it is best removed since otherwise it will interfere with the tending of the fire as it extends over opening 20.

Although several embodiments have been described it is obvious that the parts thereof can be used interchangeably where desired.

Obviously many modifications and variations of the present invention are possible in the light of the above teachings. It is therefore to be understood that within the scope of the appended claims the invention may be practiced otherwise than as specifically described.

I claim:

1. A food smoking kit for use on a brazier having a basin and a hood mounted thereon partially covering a portion of said basin, said smoking kit comprising a pair of closure members, means for pivotally mounting the closure members, one of said closure members being supportable on the basin in a horizontal position for covering a remaining portion of the basin, another of said closure members being supportable vertically on the basin to close a vertical opening in the hood, means for providing a vent opening at the upper end of the hood for the escape of the smoke generated; a grill, means for supporting the grill within the hood, means for securing said vertical closure member in an upright position, whereby smoke generated in the basin beneath said horizontal closure member will flow laterally and upwardly through the grill and out said vent opening to smoke effectively in an indirect manner any food supported on the grill.

2. The smoking kit of claim 1 wherein the vent means for the smoke is provided by varying the positions of the vertical closure member with respect to the hood.

3. The smoking kit of claim 1 wherein the pivoting means comprises a slot in one closure member adapted to receive loosely a projection on the other closure member.

4. The combination of claim 1 wherein the securing means for the vertical closure member consists of a plurality of horizontally disposed spring fingers adapted to frictionally engage the edge of the hood therebetween in a plurality of positions depending on the size of the hood, said spring fingers allowing the closure member to be adjustably positioned with respect to the hood to vary the vent opening.

5. The smoking kit of claim 1 wherein the grill is supported within the hood by a plurality of lugs secured to the inside wall of the hood.

6. In combination with a brazier having a basin and a hood mounted thereon partially covering a portion of said basin, a food smoking kit for said brazier comprising a a pair of closure members, one of said closure members having a slot adjacent one edge, and the other of said closure members having a projection along a corresponding edge for hingedly fitting loosely into the slot, one of said closure members being supportable on the basin in a horizontal position for covering the remaining opening in the basin, another of said closure members being supportable on the basin in a vertical position to close a vertical opening in the hood, means for providing a variable opening at the upper end of the vertical closure member for venting the generated smoke, means for securing said vertical closure member in a closed position, food-supporting grill means positionable within the hood and supported by the hood, whereby smoke generated in the basin beneath said horizontal closure member will flow laterally and then upwardly through the grill to smoke effectively in an indirect manner any food supported on the grill.

7. In combination with a brazier having a basin and a hood mounted thereon parfially covering a portion of said basin, a food smoking kit for said brazier comprising a pair of closure members, one of said closure members having a slot adjacent one edge, and the other of said closure members having a projection along a corresponding edge for hingedly fitting loosely in the slot, one of said closure members being supportable on the basin in a horizontal position for covering the remaining opening in the basin, another of said closure members being supportable on the basin in a vertical position to close a vertical opening in the hood, means adjustably securing the vertical closure in varying positions in relation to the hood for varying the sizes of vent opening for the generated smoke, food supporting grill means constructed of a sheet of expanded metal positionable within the hood and supported on the basin whereby smoke generated in the basin beneath said horizontal closure member will flow laterally and upwardly through the expanded metal grill to smoke effectively in an indirect manner any food supported on the grill.

8. In combination with a brazier having a basin and a hood mounted thereon partially covering a portion of said basin, a food smoking kit for said brazier comprising a pair of closure members including a horizontal closure member supportable on the basin in a horizontal position for covering a remaining portion of the basin and a vertical closure member adapted substantially to close a vertical opening in the hood, adjustable means for securing said vertical closure member in variable close proximity to the hood, food supporting means positionable within the hood and supportable by the brazier, whereby smoke generated in the basin beneath said horizontal closure member will flow laterally and upwardly through the food supporting means and past the vertical closure member to smoke effectively in an indirect method any food supported therein.

9. In combination with a brazier having a basin and a hood mounted thereon partially covering a portion of said basin, a food smoking kit for said brazier comprising a pair of closure members including a horizontal closure member supported on the basin in a horizontal position for covering a remaining portion of the basin and a vertical closure member adapted substantially to close a vertical opening in the hood, food supporting means positionable within the hood, said closure members and the food supporting means being supported on a horizontal beam extending between and resting on opposite sides of a rim of the basin, whereby smoke generated in the basin beneath said horizontal closure member will flow laterally and upwardly through the food supporting means and past the vertical member to smoke effectively in an indirect method any food supported therein.

10. In combination with a brazier having a basin and a hood mounted thereon partially covering a portion of said basin, a food smoking kit for said brazier comprising a pair of closure members including a horizontal closure member supportable on the basin in a horizontal position for covering a remaining portion of the basin and a vertical closure member adapted substantially to close a vertical opening in the hood, a rigid arm extending between the closure members for alternately supporting each other in an open position, food supporting means positionable within the hood and supportable by the brazier, whereby smoke generated in the basin beneath said horizontal closure member will flow laterally and upwardly through the food supporting means and past the vertical closure member to smoke effectively in an indirect method any food supported therein.

(References on following page)

References Cited by the Examiner

UNITED STATES PATENTS

| | | | |
|---|---|---|---|
| D. 180,740 | 8/1957 | Lowry | D81—12.2 |
| 1,509,752 | 9/1924 | Hassler et al | 99—339 X |
| 1,788,096 | 1/1931 | Friedemann | 211—153 X |
| 2,580,925 | 1/1952 | Jarvis | 126—274 |
| 2,626,561 | 1/1953 | Fortune | 99—259 X |
| 2,891,465 | 6/1959 | Rogge | 99—335 |

FOREIGN PATENTS

| | | |
|---|---|---|
| 669,321 | 8/1963 | Canada. |
| 229,433 | 2/1925 | Great Britain. |

OTHER REFERENCES

Grieve: House Beautiful, June 1961, page 49, advertisement titled "Hawaiian Bar-B-Smoker."

WALTER A. SCHEEL, *Primary Examiner.*

CLYDE I. COUGHENOUR, *Assistant Examiner.*